United States Patent [19]

Takasaki et al.

[11] Patent Number: 5,992,437
[45] Date of Patent: Nov. 30, 1999

[54] METHOD FOR DILUTING ACID OR ALKALINE STOCK SOLUTION AND APPARATUS THEREFOR

[75] Inventors: Norihiro Takasaki; Masafumi Nakamura; Toshiharu Ikuta, all of Kitakyushu, Japan

[73] Assignee: Mitsubishi Chemical Engineering Corp., Japan

[21] Appl. No.: 09/099,781

[22] Filed: Jun. 19, 1998

[51] Int. Cl.$^6$ .................................................. G05D 11/13
[52] U.S. Cl. ................................................. 137/3; 137/93
[58] Field of Search .............................. 137/3, 5, 88, 91, 137/93

[56] References Cited

U.S. PATENT DOCUMENTS

| | | | |
|---|---|---|---|
| 1,388,613 | 8/1921 | Simsohn | 137/5 |
| 3,266,504 | 8/1966 | Sundstrom | 137/93 |
| 3,451,402 | 6/1969 | Howard | 137/88 |
| 4,483,357 | 11/1984 | Roa et al. | 137/3 |

*Primary Examiner*—Stephen M. Hepperle
*Attorney, Agent, or Firm*—Parkhurst & Wendel, L.L.P.

[57] ABSTRACT

The present invention relates to a method for diluting an acid or alkaline stock solution with pure water to prepare a mixed solution of an aimed concentration, which method comprises:

an initial preparation step A, in which the prescribed amounts of a stock solution and pure water are mixed to prepare a mixed solution with a concentration different from the preset target concentration;

a concentration measuring step B, in which the concentration of the mixed solution is measured by the potentiometric titration method; and a preparation step C, in which the deficiency of the stock solution or pure water is calculated on the basis of the difference between the value of concentration measured in the step B and the value of target concentration, and 70 to 99% of the calculated deficiency of the stock solution or pure water is supplied to the mixed solution, the said steps B and C being repeated until the measured value of concentration falls within the range of the threshold of the preset target concentration.

1 Claim, 3 Drawing Sheets

5,992,437

METHOD FOR DILUTING ACID OR ALKALINE STOCK SOLUTION AND APPARATUS THEREFOR

BACKGROUND OF THE INVENTION

The present invention relates to a method for diluting acid or alkaline stock solution an apparatus therefor. More particularly, it relates to a method for diluting an acid or alkaline stock solution, which is capable of accomplishing desired dilution with higher accuracy and efficiency when, for instance, diluting a stock solution of an alkaline developer for positive resists with pure water, and an apparatus used for performing such a diluting method.

In manufacture of precision parts such as semiconductor elements, an acid or alkaline solution with a strictly controlled concentration is used. For instance, an alkaline developer such as a solution of tetramethylammonium hydroxide (TMAH) is used as a developer for positive resists, and such a developer needs to be adjusted in its concentration with tolerances of ±0.005 wt % against the aimed concentration (e.g. 2.38 wt %).

Conventionally, it has been common practice to transport the developer already adjusted to an aimed concentration by the developer maker to the site of use. Such a practice, however, requires a high cost for transport in the above practice, so that recently it is studied to transport the stock solution of the developer and to dilute the stock solution with pure water to an aimed concentration at the site of use. Then, researches have been done on the method and apparatus for diluting the stock solution to prepare a developer of an aimed concentration on the spot (site of use).

For instance, in Japanese Patent Publication (KOKOKU) No. 6-7910, there is described a developer stock solution-diluting apparatus in which the stock solution of an alkaline developer and pure water are supplied to a stirring tank having a mixing means, and a part of the mixed solution is extracted from the stirring tank to measure conductivity of the solution while the flow rates of the stock solution and pure water supplied to the mixing means are controlled. This diluting apparatus has the advantage which is capable of quick and real-time assay of concentration of the mixed solutions by the conductivity method (electrode method).

However, the diluting techniques which use the conductivity method, have the problems in relation to accuracy of measurement and stability, such as liability to error of the measurement due to temperature change in the electrode or enlargement of such error of measurement due to contamination of the electrode surface or deterioration of electrode performance, so that there is a limitation on precision attainable in preparation of the developer according to the said conventional diluting techniques. Thus, development of a method and apparatus capable of diluting a developer stock solution with pure water and preparing a developer of an aimed concentration at higher precision and efficiency, has been desired.

As a result of the present inventors' studies on the subject matter, it has been found that in the preparation of the alkaline developers by diluting their stock solutions, although it is possible to assay the solution concentration with higher precision by using the potentiometric titration method, the titration method takes a relatively long time for the assay, and can not immediately apply itself to the continuous control of flow rate of the stock solution and pure water supplied. Further, the present inventors' earnest studies for making the best use of the advantage of the titration method based on the knowledge derived from the above-mentioned finding that when an acid or alkaline stock solution and pure water are mixed and treated by combining the said potentiometric titration method and a specific batch mixing process, it is possible to bring the mixed solution to an aimed concentration (target concentration) in a short time and with higher precision. The present invention has been attained on the basis of the above finding.

SUMMARY OF THE INVENTION

The object of the present invention is to provide a method for diluting acid or alkaline stock solutions, which is capable of accomplishing desired dilution with higher accuracy and efficiency, and an apparatus used for performing such a diluting method.

To attain the above aim, in a first aspect of the present invention, there is provided a method for diluting an acid or alkaline stock solution with pure water to prepare a mixed solution of an aimed concentration, which method comprises:

an initial preparation step A, in which the prescribed amounts of a stock solution and pure water are mixed to prepare a mixed solution with a concentration different from the preset target concentration;

a concentration measuring step B, in which the concentration of the mixed solution is measured by the potentiometric titration method; and a preparation step C, in which the deficiency of the stock solution or pure water is calculated on the basis of the difference between the value of concentration measured in the step B and the value of target concentration, and 70 to 99% of the calculated deficiency of the stock solution or pure water is supplied to the mixed solution, the said steps B and C being repeated until the measured value of concentration falls within the range of the threshold of the preset target concentration.

In a second aspect of the present invention, there is provided an apparatus for diluting an acid or alkaline stock solution with pure water to prepare a mixed solution of an aimed concentration by, which apparatus comprises:

a stock solution tank, in which the stock solution is reservoired, a preparation tank, in which the stock solution and pure water are mixed to prepare a mixed solution of an aimed concentration, a stock solution feed system, by which the stock solution is supplied from the said stock solution tank to the said preparation tank, a pure water feed system, by which pure water is supplied to the said preparation tank, a concentration measurement system using the potentiometric titration method, by which the concentration of the mixed solution in the said preparation tank is measured, and a control system which controls the operations of the said elements and has such function that the measured value of concentration of the mixed solution in the said preparation tank is compared with the threshold of the preset target concentration, and when the measured value of concentration deviates from the threshold of the target concentration, the deficiency of the stock solution or pure water is calculated on the basis of the difference between the measured value of concentration and the preset target concentration, and the said stock solution or pure water feed system is actuated to supply 70 to 99% of the deficiency of the stock solution or pure water to the said preparation tank.

DETAILED DESCRIPTION OF THE INVENTION

Figure 1:
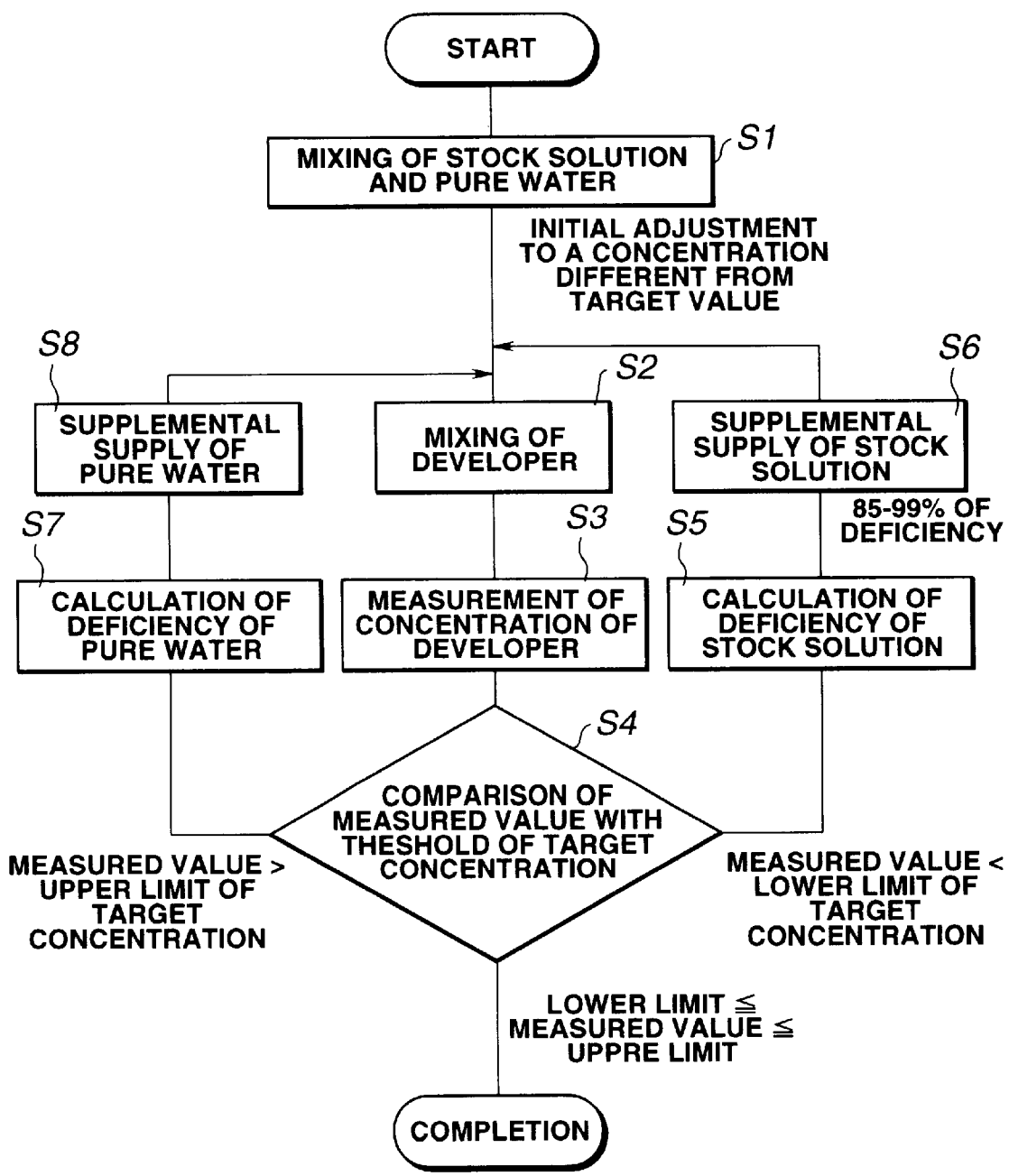
FIG. 1 is a flow chart showing the essential steps in the diluting process according to the present invention.

A preferred embodiment of the present invention is described below with reference to the accompanying drawings. In this embodiment, dilution of an alkaline developer stock solution according to the method of the present invention is described, but the method of the present invention can as well be applied to the dilution of other kinds of acid and alkaline solutions as far as these solutions are capable of neutralization titration, by properly changing the stock solution, titration standard solution, preset target concentration and other conditions.

First, the diluting method according to the present invention is explained. The diluting method of the present invention is a process for diluting the stock solutions of the alkaline developers with pure water to prepare the developers of the aimed concentrations. The developers prepared in the present invention include inorganic alkaline aqueous solutions comprising a mixture of sodium phosphate, sodium hydroxide, sodium silicate or the like and other inorganic alkalis; organic alkaline aqueous solutions; tetramethylammonium hydroxide (TMAH) aqueous solution; trimethylmonoethanolammonium hydroxide aqueous solution; and the like. As the stock solution to be processed by the method of the present invention, there are used, for example, the above-mentioned solutions in which the concentration of the said component is set at about 10 to 30 wt %. As the pure water used for dilution, so-called ultrapure water obtained by purifying water by using an ion exchange resin or other specific means is used.

The diluting method of the present invention is an asymptotic batch-type method according to which the concentration of the initially prepared developer is brought closer stepwise to the target concentration. This diluting method comprises essentially an initial preparation step (A), a concentration measuring step (B) and a preparation step (C). In the following explanation of the respective steps, the step numbers (S1–S8) used in FIG. 1 for the purpose of illustration are referred to in the parentheses.

Before conducting the process comprising the above steps, the target concentration of the prepared developer and the range from the upper limit to the lower limit value of the acceptable developer concentration (hereinafter referred to as threshold of the target concentration) are set. For example, in the case of a developer comprising TMAH and water, the concentration of TMAH is set at 2.380 wt % and the threshold of the target concentration at 2.380±0.003 wt %.

The initial preparation step (A) is a step in which the prescribed amounts of a developer stock solution and pure water are mixed to prepare a developer of a concentration different from the preset target concentration (S1–S2). In this step, the amount of either the stock solution or water is set at 90 to 99%, preferably 92 to 98% based on the required amount while the amount of the other is set at 100% of the requirement. For example, in case where it is preferred to prepare a developer containing 2.380 wt % of TMAH, the amount of the stock solution is set at 97% based on the required amount and the amount of pure water is set at 100% based on the required amount in the initial preparation step (A).

In the flow sheet of FIG. 1 and in the following explanation, there is shown the case where the amount of the stock solution mixed is set at 90 to 99% based on the required amount and the amount of pure water set at 100% based on the required amount. It is possible to set the amount of the stock solution at 100%, with the amount of pure water being slightly lessened correspondingly, and in this case, the two expressions "stock solution" and "pure water" need to be simply interchanged.

The concentration measuring step (B) is a step in which the concentration of the developer is measured according to the potentiometric titration method (S3). The potentiometric titration method used in the present invention is a means for measuring the solution concentration by making use of the known neutralization titration technique, according to which the sample is titrated with a standard solution of an acid material such as sulfuric acid or hydrochloric acid, and the titration point is detected through potential difference. When this method is used for the determination of the developer concentration, it is possible to determine the concentrations of the alkali components with tolerance held to 1/1,000 to 2/1,000 wt %.

In case where the amount of the stock solution is set to be less than the required amount in the said step (A), the concentration measured in the step (B) naturally represents a value lower than the target concentration, and usually it is outside the threshold of the target concentration, namely below the lower limit of the target concentration. So, the measured value of concentration obtained in the step (B) is compared with the threshold of the preset target concentration, and it is judged whether or not the measured value of concentration falls within the threshold of the target concentration (S4). When it is judged that the measured concentration is outside the threshold of the target concentration, the process is allowed to proceed to the next step (C).

In the step (C), the deficiency of the stock solution is calculated on the basis of the difference between the measured value of concentration and the target concentration (S5), and the stock solution or pure water 70 to 99%, preferably 92 to 98% based on the calculated deficiency thereof is supplied to the initially prepared developer (S6). In the case of a developer containing TMAH, the deficiency of the stock solution is calculated and, for instance, the stock solution of 95% based on the deficiency thereof is supplied to the developer.

In the process of the present invention, the steps (B) and (C) are repeated until the value of concentration measured in the step (B) falls in the threshold of the target concentration. That is, in case where the step (C) was conducted in the manner described above, the step (B) is repeated (S3), then the measured value of concentration is compared with the threshold of the target concentration in the same way as described above, and then it is judged whether the step (C) should be conducted again (S4). When the measured value obtained in the step (B) falls within the threshold of the target concentration, the whole process is completed. In the case of the developer described above, it is possible to adjust the TMAH concentration in the range of 2.380±0.003 wt % usually by conducting twice or so the step (C) in which the stock solution of 95% based on the deficiency thereof is supplied to the developer.

In the above dilution process, when it is judged in the step (C) that the value of concentration measured in the second run of the step (B) is higher than the threshold of the target concentration as a result of mixing of the stock solution of an amount very close to 100% of the deficiency in the developer, usually pure water in slight excess of the calculated deficiency, for example, 105 to 150% of the calculated deficiency, is mixed in the developer in the next step (C) (S7–S8) to reset the concentration at a level lower than the threshold of the target concentration, and the steps (B) and (C) are conducted again.

The present invention includes an embodiment in which in the step (C) (S7–S8), pure water of an amount of 70 to 99% based on the calculated deficiency is mixed in the developer so that the target concentration is approached gradually from a value above the threshold. In this case, there are required two sets of precision constant delivery pump, one for regulating the feed of the stock solution and the other for pure water, which is disadvantageous in terms of manufacturing cost of the apparatus. In the case of the method in which pure water in slight excess of the calculated deficiency is added, a precision constant delivery pump is required only for the stock solution and pure water need not be measured precisely.

The reason why a developer of a concentration different from the target concentration is prepared first in the step (A) in the dilution process of the present invention is as follows. In case where the concentration of the developer initially prepared in the step (A) is set at the target concentration, the difference between the actual concentration and the target concentration becomes very small, so that when the developer stock solution or pure water is supplied in the step (C), such supply tends to be made in excess due to the involvement of such matters as measuring and precision of control in the process, which may necessitate expansion of the preparation step (C).

In the present invention, the amount of the stock solution to be mixed in the developer in the step (C) is set to be in the above-defined range to the deficiency of the stock solution for the following reason. If the stock solution is supplied in a higher percentage than the defined range in the step (C), there is a fear that the stock solution be supplied in excess due to the involvement of the same problems as mentioned above. If the supply is made in a lower percentage than the defined range, the difference between the actual concentration after the supply and the target concentration may not be lessened. In either case, expansion of the preparation step (C) may be necessitated.

According to the diluting method of the present invention, the precise measurement of concentration can be made by the potentiometric titration method, the deficiency of the stock solution or pure water is supplied, and such stock solution or pure water is mixed at a prescribed amount smaller than the deficiency, so that it is possible to converge the developer concentration to a value very close to the target concentration stepwise with a minimized number of steps and to attain aimed dilution at very high precision. The above-described dilution method can be practiced effectively by using the diluting apparatus of the present invention described below.

First, an embodiment of the diluting apparatus of the present invention designed for diluting the alkaline developers is explained, but the diluting apparatus of the present invention can be used for diluting both acid and alkaline solutions by properly changing the stock solution, titration standard solution, preset target concentration and other conditions.

Figure 2:
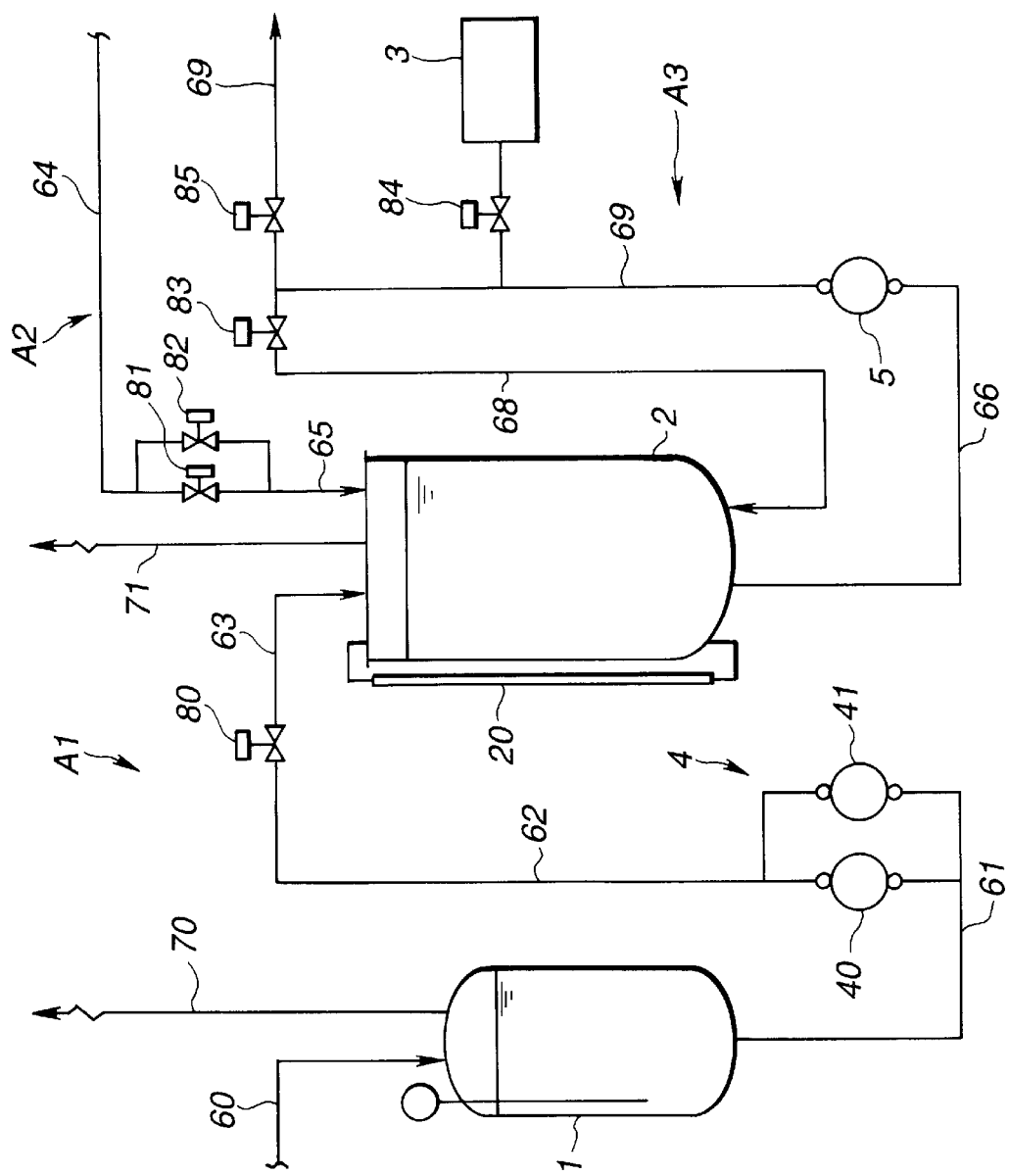
FIG. 2 is an outline installation view of the diluting apparatus according to the present invention.

The diluting apparatus of the present invention is a mechanism for preparing the developers of aimed concentrations by diluting the stock solutions of the alkaline developers with pure water. As shown in FIG. 2, the apparatus comprises a stock solution tank 1 where the developer stock solution to be treated is reservoired, a preparation tank 2 where the developer is prepared by mixing the stock solution and pure water, a stock solution feed system A1 by which the stock solution is supplied to the preparation tank 2 from the stock solution tank 1, a pure water feed system A2 by which pure water is supplied to the preparation tank 2, a concentration measurement system 3 using the potentiometric titration technique, by which the concentration of the developer in the preparation tank 2 is measured, and a control system (not shown) which controls the operations of the said elements.

The stock solution tank 1 is a buffer tank provided to supply the stock solution to the preparation tank 2 as required, and comprises an anti-corrosive container having an internal volume of around 100 to 2,000 litres. The stock solution tank 1 is furnished with a pipe 60 which can be connected to a carrier vessel (not shown) of the stock solution brought into the mechanism. The stock solution delivered from the carrier vessel under the force of an inert gas such as nitrogen gas is supplied into the tank 1 through the pipe 60. The stock solution tank 1 may also be provided with a nitrogen-sealed pipe 7 for preventing contact with the atmospheric air.

The preparation tank 2 is designed to prepare a developer by diluting the stock solution, and comprises an anti-corrosive container having an internal volume of around 500 to 3,000 litres. The preparation tank 2 is furnished with a level gage 20 capable of optical or conductivity-type point measurement for measuring the quantity of the stock solution or pure water supplied. The preparation tank 2 may also be provided with a nitrogen-sealed pipe 71 for preventing contact with the air.

The stock solution feed system A1 comprises a pipe 61 connected to the tank 1 for drawing out the stock solution therefrom, pumps 4 for supplying the stock solution to the tank 2, a pipe 62 connected to the delivery side of the pumps 4, an on-off valve 80 which controls supply of the stock solution to the tank 2, and a pipe 63 serving as an inlet of the stock solution to the tank 2. The pumps 4 are each a constant delivery pump such as a rotary pump capable of feeding the stock solution in a pressurized state at a constant and controlled flow rate. Two pumps 40 and 41 different in displacement are provided in juxtaposition for menhancing the feed controlling precision according to the feed rate.

The pure water feed system A2 comprises a pure water feed pipe 64, a pair of on-off valves 81 and 82 for controlling supply of pure water to the tank 2, and a pipe 65 functioning as an inlet of pure water into the tank 2. The pipe 64 is connected to a pertinent pure water-producing equipment in which the supplied pure water is further purified to ultrapure water by using an ion exchange resin or other means, and the produced ultrapure water is supplied under force by a pump provided on the pure water producing equipment side. The said on-off valves 81 and 82 are disposed in juxtaposition for enhancing the feed controlling precision according to the feed rate of pure water.

As the concentration meter 3 is used a measuring device making use of potentiometric titration technique, for example, Process Titrator PAT-50 (mfd. by Dia Instruments Co., Ltd.). The concentration measurement system 3 is provided in a developer circulating and discharging system A3 adapted to the tank 2. More specifically, the said concentration measurement system 3 is set to a branch of a pipe 67 through an on-off valve 84. A pure water feed line (not shown) for washing the titration cell is connected to the concentration measurement system 3.

The circulating and discharging system A3 constitutes a line for circulating and mixing the developer stock solution and pure water in the tank 2 and supplying the prepared developer to its storage tank (not shown). In this circulation and discharge system A3, the circulation system comprises a pipe 66 connected to the tank 2 for drawing out the developer therefrom, a pump 5 for supplying the developer under force, a pipe 67 connected to the delivery side of the pump 5, an on-off valve 83 for controlling the return flow of the developer to the tank 2, and a pipe 68 serving as a return line to the tank 2. The discharge system comprises an on-off valve 85 provided in a branch of the pipe 67 for controlling withdrawal of the prepared developer from the tank 2, and a pipe 69 for guiding the said developer to a storage tank (not shown).

The pump 5 in the circulation and discharge system A3 is the one which is capable of securing a preferred circulation rate of the developer when it is circulated and mixed, and can also draw out and forward the prepared developer. This pump is provided between the pipes 66 and 67.

In the diluting apparatus according to the present invention, there is also provided a mechanism for forming a jet at the bottom of the preparation tank 2 for further enhancing the stirring function of the tank 2 when the developer is circulated by the circulation and discharge system A3. This mechanism comprises a jet nozzle (not shown) adapted at the foremost end of the pipe 68, namely at the joint of the pipe 68 to the tank 2, the said jet nozzle being designed to eject the pressurized fluid (developer) from the end of the pipe 68 into the tank 2 to give a physical impact to the developer in the tank 2 by the ejection energy.

In the diluting apparatus of the present invention, there is further provided a control system having the specific functions which include dilution and preparation of a developer of a aimed concentration at high precision and efficiency in the tank 2. This control system comprises, although not shown, an input device by which the signals from the elements such as level gage 20, pump 4, concentration measurement system 3, etc., are converted to digital signals, operational processing devices such as program controllers including micro-computers and personnel computer, and an output device by which the control signals from the operational processors are converted to analogue signals.

In operation of the control unit, the concentration of the developer in the tank 2 measured by the concentration measurement system 3 is compared with the preset threshold of the target concentration, and when the measured value of concentration is inconsistent with the threshold, the deficiency of the developer stock solution or pure water is calculated based on the measured concentration and the preset target concentration and the stock solution feed system or pure water feed system is actuated to supply the stock solution or pure water of 70 to 99%, preferably 92 to 98% based on the deficiency thereof to the tank 2.

In the diluting apparatus of the present invention, the said control unit operates to let the respective steps of the dilution process proceed as programmed. For conducting the step (A) for preparing the first developer, the stock solution feed system A1 and the pure water feed system A2 are operated. First, the on-off valves 81 and/or 82 in the pure water feed system A2 are opened to supply pure water from the pure water producing equipment to the tank 2.

Then one of the pumps 4 (40 or 41 which has a greater delivery rate) is actuated and the on-off valve 80 is opened to supply the stock solution from its tank 1 to the preparation tank 2. Feed of the stock solution and pure water to the tank 2 is controlled by the operations of the pump 4, on-off valve 80 and on-off valve 81 (and/or 82) according to the signals from the level gage 20 of the tank 2 (S1).

After the prescribed amounts of stock solution and pure water have been supplied to the tank 2, the circulation and discharge system A3 is operated to mix the said stock solution and pure water to prepare the first developer in the tank 2. This mixing operation is initiated by starting the pump 5 and opening the on-off valve 83 (S2). As a jet nozzle is adapted at the joint of the pipe 68 to the tank 2, the mixing can be accomplished in a short time and also there is no risk of inclusion of impurities due to dusting such as observed in use of an impeller type stirrer.

Then the step (B) for measuring the developer concentration is conducted. Measurement of the developer concentration is usually conducted immediately after completion of the said operation of mixing and preparing the developer in the tank 2. The on-off valve 84 is opened to introduce part of the developer into the concentration measurement system 3 via the pipe 67 of the circulation and discharge system A3 to assay the developer concentration. The potentiometric titration method used for the concentration assay in the concentration measurement system 3 allows determination of the concentration at notably high precision.

The value of developer concentration determined by the concentration measurement system 3 is input to the control unit in which the said value is compared with the preset threshold value of target concentration. When, after the above comparison, it is judged that the measured value of concentration is outside the threshold of target concentration, the process is allowed to proceed to the next preparation step (C) (S4).

In the step (C), when it is judged that the prepared developer has a lower value of concentration than the threshold of target concentration, the control system operates to determine the deficiency of the stock solution based on the difference between the measured value of concentration and the target concentration, calculates the amount equivalent to 70 to 99% of the deficiency (S5) and actuates the stock solution feed system A1 to give an additional supply of stock solution. The stock solution is supplied to the tank 2 by operating the en pump 40 or 41 (the one having a smaller delivery rate) and by opening the on-off valve 80.

On the other hand, when it is judged that the measured developer concentration is higher than the threshold of the target concentration, the control unit measures the deficiency of pure water based on the difference between the measured concentration and the target concentration, calculates the amount equivalent to 70 to 99% of the deficiency (S7) and actuates the pure water feed system A2 to supply pure water by an amount corresponding to 70 to 99% of the deficiency. Pure water is supplied to the tank 2 by opening the on-off valves 81 and/or 82. Feed of the stock solution is controlled according to the signal of the shot number of the pump 4.

After supplemental supply of the stock solution and pure water to the tank 2, the circulation and discharge system A3 is operated to again mix the developer in the tank 2 (S2) and then the concentration measurement system 3 is operated to again perform the concentration measuring step (B). Thus, the control system operates to repeat the steps (B) and (C) until the measured value of concentration falls within the threshold of target concentration, and end the preparation operation when it judges that the measured concentration is within the threshold of target concentration.

With operation of the circulation and discharge system A3, the developer prepared in the tank 2 is introduced into the said storage tank provided for supplying the developer to a work step such as the step of forming the positive resists of a semiconductor producing apparatus. Thus, the developer in the tank 2 is discharged out through the pipe 69 by operating the pump 5 and by opening the on-off valve 85.

As described above, according to the method and apparatus for diluting the acid or alkaline stock solutions of the present invention, precise measurement of concentration is attained by use of the potentiometric titration method and when the deficiency of the stock solution or pure water is supplemented, such stock solution or pure water is supplied by a prescribed amount less than the deficiency, so that it is possible to converge the concentration of the mixed solution to a value very close to the target concentration stepwise with a minimized number of steps, and when, for instance, an alkaline stock solution is diluted with pure water to prepare an alkaline developer, such dilution and preparation can be accomplished at very high precision and efficiency.

EXAMPLES

An aqueous TMAH solution was prepared as a positive resist developer by a diluting apparatus substantially same as illustrated in FIG. 2. In the diluting apparatus, a fluorine resin-lined vessel having an internal volume of 1,500 litres was used as the stock solution tank 1. A similar fluorine resin-lined vessel with an internal volume of 1,000 litres was used as the preparation tank 2. The pump unit 4 of the stock solution feed system A1 consisted of two pumps: an initial preparation pump 40 and a preparation (complemental supply) pump 41. A circulation and discharge pump 5 alone was used as the pumping means for the circulation and discharge system A3.

Process Titrator PAT-50 mfd by Dia Instruments Co., Ltd. was used as the concentration meter 3. The titration buret of this concentration meter had a capacity of 25 ml and its analysis capability was 1 $\mu$l/pulse. A standard solution of sulfuric acid was used as titrant for the concentration meter 3.

In preparation of the developer, an aqueous solution with a TMAH concentration of 20 wt % was used as the stock solution and ion exchanged water was used as pure water. In the preparation operation, the TMAH concentration (target concentration) was set at 2.380 wt % and its tolerance limits(threshold of the target concentration) were set at 2.380±0.003 wt %. The operating systems of the diluting apparatus were sealed with nitrogen gas.

Figure 3:
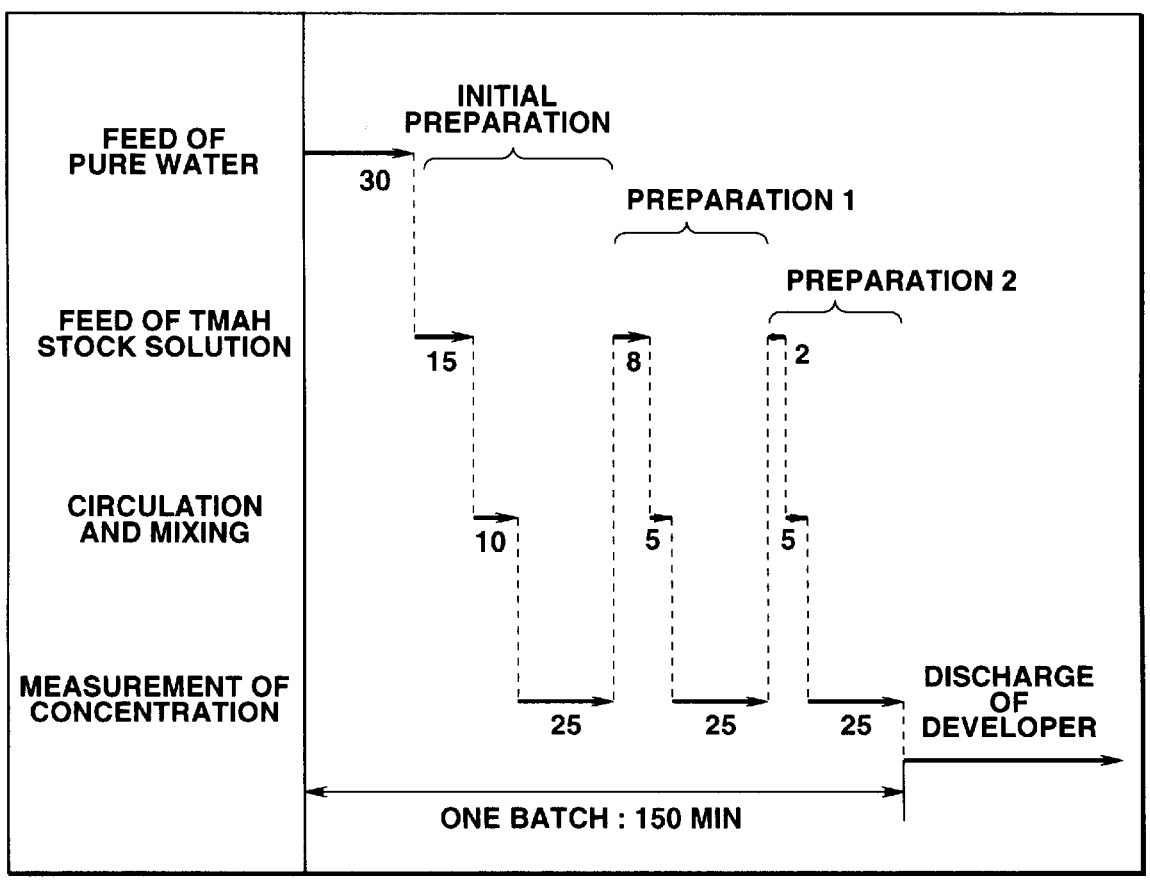
FIG. 3 is a time chart showing the approximate periods of time required for the principal operations in the preparation process (a time chart of an example of the diluting operation) in Example.

In the initial preparation step A, 114 litres of the stock solution corresponding to 97% of the requirement and 882 litres of pure water were supplied to the preparation tank 2 and mixed. Then, the concentration measuring step B and the preparation step C were repeated twice. In each run of the preparation step C, the initially prepared developer in the tank 2 was supplemented with the stock solution of an amount corresponding to 95% of its deficiency. The final measurement of concentration showed that the concentration of the developer obtained in the tank 2 was within the defined threshold of the target concentration. The results obtained after 5 runs of the same preparation process are shown in Tables 1 and 2. A flow sheet showing the approximate periods of time required for the principal operations in 5 runs of the preparation process (a time chart of an example of the diluting operation) is shown in FIG. 3.

TABLE 1

|  |  | Batch 1 | Batch 2 | Batch 3 |
|---|---|---|---|---|
| Initial preparation | Mixing ratio (%) | 96.7 | 96.6 | 97.7 |
|  | Measured concentration (wt %) | 2.301 | 2.299 | 2.325 |
| Preparation 1 | Pump shot number | 706 | 724 | 494 |
|  | Measured concentration (wt %) | 2.374 | 2.373 | 2.374 |
| Preparation 2 | Pump shot number | 57 | 62 | 51 |
|  | Measured concentration (wt %) | 2.380 | 2.379 | 2.380 |
| Target concentration |  | 2.380 | 2.380 | 2.380 |

TABLE 2

|  |  | Batch 4 | Batch 5 |
|---|---|---|---|
| Initial preparation | Mixing ratio (%) | 97.1 | 96.9 |
|  | Measured concentration (wt %) | 2.311 | 2.306 |
| Preparation 1 | Pump shot number | 615 | 665 |
|  | Measured concentration (wt %) | 2.373 | 2.372 |
| Preparation 2 | Pump shot number | 64 | 71 |
|  | Measured concentration (wt %) | 2.379 | 2.379 |
| Target concentration |  | 2.380 | 2.380 |

What is claimed is:

1. An apparatus for diluting an acid or alkaline stock solution with pure water to prepare a mixed solution of an aimed concentration by, which apparatus comprises:
   a stock solution tank, in which the stock solution is reservoired,
   a preparation tank, in which the stock solution and pure water are mixed to prepare a mixed solution of an aimed concentration,
   a mechanism for forming a jet provided at the bottom of said preparation tank,
   a stock solution feed system, by which the stock solution is supplied from said stock solution tank to said preparation tank,
   a pure water feed system, by which pure water is supplied to said preparation tank,
   a concentration measurement system using the potentiometric titration method, by which the concentration of the mixed solution in said preparation tank is measured, and
   a control system that controls the operations of said elements and has such function that the measured value of concentration of the mixed solution in said preparation tank is compared with the threshold of the preset target concentration, and when the measured value of concentration deviates from the threshold of the target concentration, the deficiency of the stock solution or pure water is calculated on the basis of the difference between the measured value of concentration and the preset target concentration, and said stock solution or pure water feed system is actuated to supply 70 to 99% of the deficiency of the stock solution or pure water to said preparation tank.

* * * * *